United States Patent [19]

Matthies

[11] 3,833,408

[45] Sept. 3, 1974

[54] VIDEO DISCS HAVING A METHYL ALKYL SILICONE COATING

[75] Inventor: Dennis Lee Matthies, Princeton, N.J.

[73] Assignee: RCA Corporation, New York, N.Y.

[22] Filed: Apr. 19, 1972

[21] Appl. No.: 245,663

[52] U.S. Cl. ............... 117/217, 117/218, 117/71 R, 117/72, 117/138.8 R, 117/138.8 A, 117/161 ZA, 117/169 A, 179/100.2 A, 252/27, 252/28, 252/49.6

[51] Int. Cl. ............................................ G11b 5/00

[58] Field of Search ......... 117/217, 169 A, 161 ZA, 117/218, 71 R, 72, 138.8 R, 138.8 A; 252/27, 28, 49.6; 179/100.2 A

[56] References Cited

UNITED STATES PATENTS

| | | | |
|---|---|---|---|
| 3,072,543 | 1/1963 | Lubow et al. | 252/27 |
| 3,109,749 | 11/1963 | Ricco | 179/100.2 A |
| 3,288,710 | 11/1966 | Hollitz | 252/49.6 |
| 3,466,156 | 9/1969 | Peters et al. | 179/100.2 A |
| 3,537,997 | 11/1970 | Wright | 252/49.6 |
| 3,578,596 | 5/1971 | Conway | 252/49.6 |

FOREIGN PATENTS OR APPLICATIONS

| | | |
|---|---|---|
| 153,300 | 2/1922 | Great Britain |

*Primary Examiner*—Charles E. Van Horn
*Assistant Examiner*—Frank Frisenda, Jr.
*Attorney, Agent, or Firm*—Glenn H. Bruestle; Birgit E. Morris

[57] ABSTRACT

Application of certain methyl alkyl siloxane compounds to the surface of video disc replicas reduces surface friction generated during playback with no sacrifice in video quality.

5 Claims, No Drawings

VIDEO DISCS HAVING A METHYL ALKYL SILICONE COATING

This invention relates to improved video discs. More particularly, this invention relates to video disc replicas coated with certain methyl alkyl siloxane compounds.

BACKGROUND OF THE INVENTION

A video information system for recording and playback of video information has been described in copending U.S. application of Clemens, Ser. No. 126,772 filed Mar. 22, 1971. According to this system, video and/or video and audio information is recorded in the form of geometric variations in the bottom of a spiral groove on a surface of a disc. Disc replicas made of an insulating material, such as vinyl, are then coated first with a conductive material and then with a dielectric film. A metal tipped stylus acts as a second electrode of a capacitor and the video signal is monitored by the stylus which notes changes in capacitance between the stylus and the record as these geometric variations in the form of depressions pass under the stylus. Since the groove density of video discs is from about 1000-4000 grooves per inch, the stylus tips of necessity are very fine and delicate.

From time to time during playback, it has been observed that the stylus is broken or ruptured, probably due to friction between the stylus and the disc surface. Since the stylii are highly specialized and expensive, continual replacement greatly adds to the cost of playback of video recordings. Accordingly, a convenient means of reducing the friction between the stylus and the disc during playback, such as application of a surface lubricant which would not reduce the fidelity of the recording, would be highly desirable.

However, due to the stringent requirements for such a surface lubricant, none that has been completely satisfactory has been known until now. A suitable lubricant for video disc replicas, in addition to imparting good lubricity to the disc surface, must have proper surface tension, adhesion to the disc surface, cohesion and elasto-hydrodynamic properties so as to form a uniform, thin film which will support the stylus at a constant height above the signal elements during playback. In addition, the lubricant must be stable against degradation due to wear caused by repeated playbacks. The lubricant must also resist evaporation or oxidation in the atmosphere for prolonged periods. It is further desirable that the lubricant be a good electrical insulator with a high dielectric strength. Still further, the lubricant must be chemically inert with respect to the material of the video disc replica itself, the conductive coating and the dielectric coating thereon.

SUMMARY OF THE INVENTION

It has been discovered that the application of a thin film of certain methyl alkyl siloxane compounds to the surface of a video disc replica provides a thin, uniform, stable coating which greatly reduces the surface friction between the disc and a playback stylus. In addition to imparting lubricity to the surface, the siloxane film acts as an electrically insulating layer on the video disc surface, and is long lasting and adherent.

DETAILED DESCRIPTION OF THE INVENTION

The methyl alkyl siloxane compounds useful as coatings according to the present invention have the formula $$(CH_3)_3\text{—Si—O}\!\left[\begin{matrix} CH_3 \\ | \\ \text{—Si—O—} \\ | \\ R \end{matrix}\right]_x\!\text{Si}(CH_3)_3$$

wherein R is an alkyl group, preferably of from 4–20 carbon atoms, and $x$ is an integer. These methyl alkyl siloxane compounds vary from liquids to waxes, depending on their molecular weight. The preferred siloxanes are liquids having a coefficient of friction of from about 0.75 to 1.8.

A siloxane compound as described above is applied to the surface of a video disc replica as a dilute solution in a suitable solvent, such as isopropanol. The amount of the siloxane compound in the solution is not critical and a convenient level can be readily determined. The solution can be applied to the surface of the disc in any convenient manner, as by brushing, spraying, rolling and the like, preferably while rotating the video disc at a speed high enough to distribute the solution evenly to the entire surface and to cause any excess solution to be drawn off. The solvent is then removed in conventional manner, as by evaporation. Alternatively, the siloxane compound can be applied without a solvent as by evaporation coating and the like.

In a preferred embodiment of the present invention, a 0.5% by weight solution of a methyl alkyl siloxane commercially available from the General Electric Company as SF-1147 having a viscosity at 77° F of 49.0 cstks and a specific gravity 60/60° of 0.89 in isopropanol is sprayed onto the surface of a vinyl video disc replica prepared according to the method of Clemens as disclosed in copending application Ser. No. 126,772 filed Mar. 22, 1971 having a thin layer of gold and a thin layer of polystyrene thereon. The disc is rotated at a speed of about 600 rpm during the application. This coating results in a uniform, stable, lubricating film on the surface of the disc replica which provides electrical insulation and increases the life of stylii employed during playback of the video disc.

I claim:

1. Information storage means adapted to provide capacitance variations to a pickup means, said storage means comprising a conductive storage medium in which information is recorded in the form of geometric variations on a conductive surface thereof, a dielectric coating disposed over said conductive surface and a thin coating of uniform thickness of a methyl alkyl silicone of the formula $$(CH_3)_3\text{—Si—O}\!\left[\begin{matrix} CH_3 \\ | \\ \text{—Si—O—} \\ | \\ R \end{matrix}\right]_x\!\text{Si}(CH_3)_3$$

wherein R is an alkyl group and $x$ is an integer, disposed over said dielectric coating.

2. Storage means according to claim 1 wherein the alkyl group has 4–20 carbon atoms.

3. A capacitive video frequency recording means in the shape of a disc, having a spiral groove on a face thereof and video information in the form of geometric variations in the bottom of said groove, said disc having at least 1,000 grooves per inch, said disc having a thin conductive layer on said face, a thin dielectric layer disposed over the conductive layer and a thin coating of uniform thickness of a methyl alkyl silicone of the formula $$(CH_3)_3-Si-O-\left[\begin{array}{c}CH_3\\ |\\ -Si-O-\\ |\\ R\end{array}\right]_x-Si(CH_3)_3$$

wherein R is an alkyl group and $x$ is an integer, disposed over said dielectric coating.

4. A recording means according to claim 3 wherein the alkyl group has from 4–20 carton atoms.

5. A recording means according to claim 4 wherein the conductive layer is gold and the dielectric layer is polystyrene.

* * * * *

UNITED STATES PATENT OFFICE

CERTIFICATE OF CORRECTION

Patent No. 3,833,408 Dated September 3, 1974

Inventor(s) Dennis Lee Matthies

It is certified that error appears in the above-identified patent and that said Letters Patent are hereby corrected as shown below:

In the claims:

Column 4, line 4, change "carton" to -- carbon --.

Signed and sealed this 17th day of December 1974.

(SEAL)
Attest:

McCOY M. GIBSON JR.
Attesting Officer

C. MARSHALL DANN
Commissioner of Patents